United States Patent [19]

Bramer

[11] Patent Number: 4,690,013

[45] Date of Patent: Sep. 1, 1987

[54] REMOTE CONTROL REAR VIEW MIRROR, CABLE OPERATED

[75] Inventor: Charles Bramer, Norton Shores, Mich.

[73] Assignee: Lacks Industries, Inc., Grand Rapids, Mich.

[21] Appl. No.: 829,004

[22] Filed: Feb. 13, 1986

[51] Int. Cl.$^4$ .............................................. F16C 1/10
[52] U.S. Cl. ................................ 74/501 M; 74/501 R
[58] Field of Search ........................ 74/501 M, 501 A

[56] References Cited

U.S. PATENT DOCUMENTS

| | | | |
|---|---|---|---|
| 3,251,238 | 5/1966 | Fuqua | 74/501 M |
| 3,286,545 | 11/1966 | Malachowski | 74/501 M |
| 3,550,470 | 12/1970 | Brighton et al. | 74/501 M |
| 3,554,049 | 1/1971 | Holmes | 74/501 M |
| 3,780,598 | 12/1973 | Menger | 74/501 M |
| 3,934,489 | 1/1976 | Bottrill | 74/501 M |
| 4,411,403 | 10/1983 | Tomsu | 74/501 M |
| 4,440,039 | 4/1984 | Bramer | 74/501 M |
| 4,461,190 | 7/1984 | Bramer | 74/501 M |

FOREIGN PATENT DOCUMENTS 2802503  7/1978  Fed. Rep. of Germany ... 74/501 M

Primary Examiner—Gary L. Smith
Assistant Examiner—Vinh Luong
Attorney, Agent, or Firm—Shoemaker and Mattare, Ltd.

[57] ABSTRACT

A rear view mirror assembly comprising a housing shell with a mirror glass receptive member that has a spherical surfaced projection on the back side thereof that is received in snap-lock engagement with a gimbal mounted ring in the housing shell so that the two are afforded relative movement therebetween. A gear toothed segment on an extended arm is provided on the mirror glass receptive member which is engaged by a pinion gear mounted on the gimbal ring so that when the pinion gear is turned, via a single strand bowden wire remote control operating structure, the mirror glass receptive member is actuated relative to the gimbal ring to effect a mirror adjustment, and when the pinion gear is moved axially the gimbal ring and the mirror glass receptive member are actuated together to effect a relatively different mirror adjustment movement.

5 Claims, 6 Drawing Figures

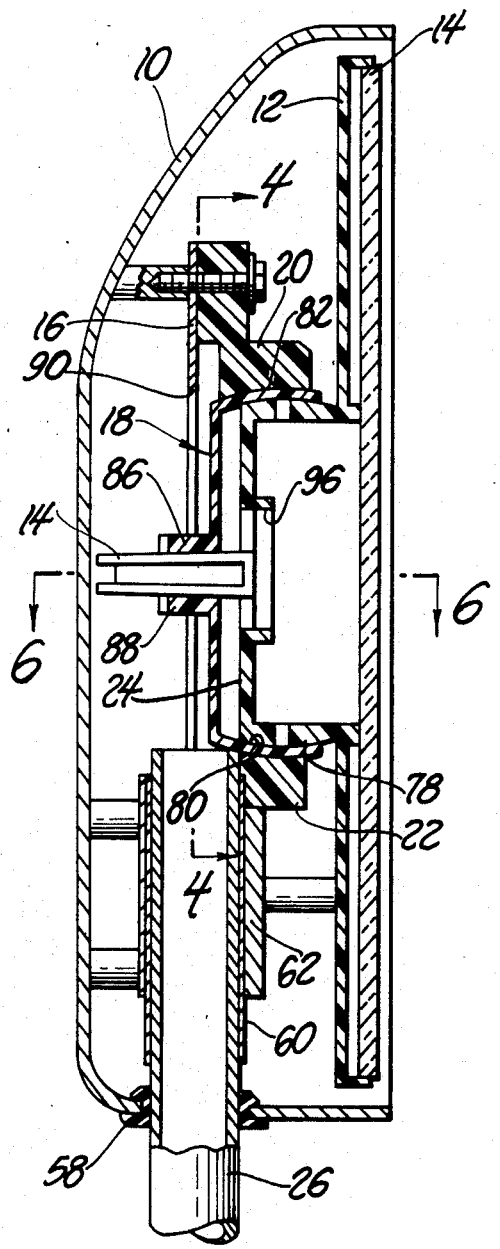
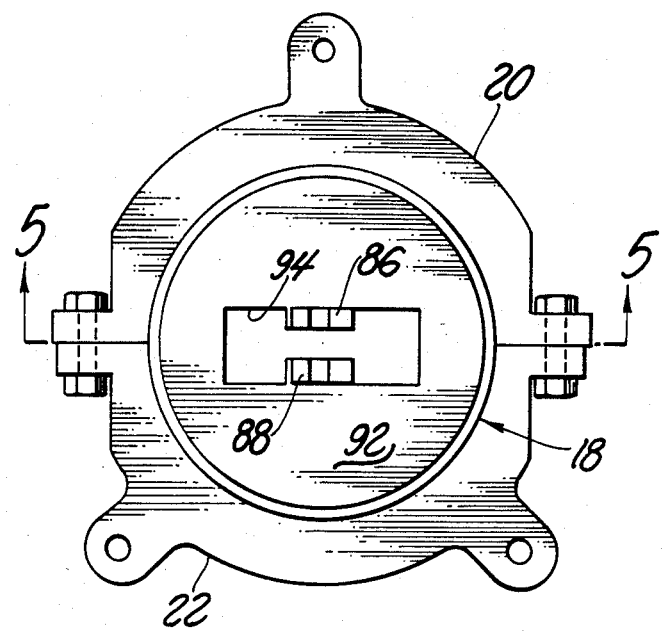
Fig. 4
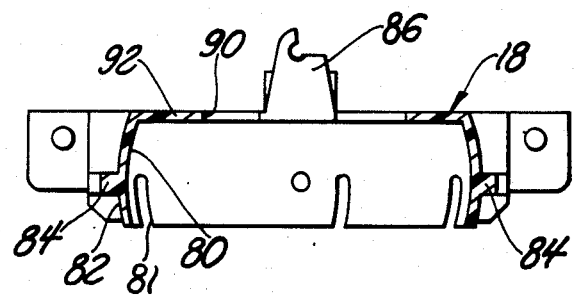
Fig. 5
Fig. 3
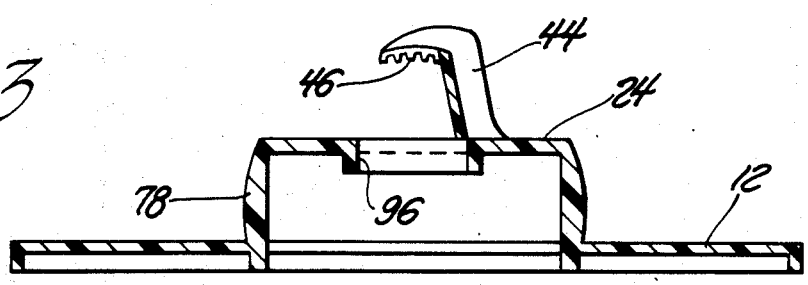
Fig. 6

REMOTE CONTROL REAR VIEW MIRROR, CABLE OPERATED

BACKGROUND OF THE INVENTION

This invention relates to remote control rear view mirrors for vehicle use, principally, and which includes a single control cable operator and an improved gimbal mount construction for greater simplicity and ease of manufacture and better performance and operation in service.

Heretofore remote control rear view mirrors have been principally of the kind which includes a two or three strand control cable and some form of biasing means for counteracting the different cable effected movements. Or, they have otherwise included some complicated and intricate means of operation which has made manufacture difficult, and therefor expensive, and the operation and performance over long years other than trouble-free.

It is an object of this invention to provide a simplified construction for a rear view mirror assembly and one which will enable it to be made for manual adjustment, for remote control cable adjustment and also for remote control electrical adjustment.

The simplified construction makes use of a minimum number of manufactured parts, parts which may be molded and made of plastic material, with some chrome finished, and which may be fastened together or fitted for relative movement therebetween, and making use of the naturally low coeficient of friction and/or need for lubrication between such co-acting parts.

The present invention presents a construction which permits a large viewing mirror to be mounted in a relatively shallow housing and to have a gimbal support and a greater flutter resistant ball support, in combination, for improved performance.

The assembly of the mirror parts of the present invention is simplified by allowing pre-assembly of the functional parts, without the mirror glass, snap fitting the gear member on the control cable into position and fastening the parts and the mounting plate together, at the same time, in the mirror housing, with the same screw fasterners.

These and other objects and advantages in the practice of the present invention will be more obvious and apparent in the general and detailed description of the mirror structure and its operation which follows hereinafter.

DESCRIPTION OF THE DRAWING FIGURES

FIG. 3 is a cross-sectional view of the mirror as shown in FIG. 2, as seen in the plane of line 3—3 and looking in the direction of the arrows.

FIG. 4 is a cross-sectional view of the gimbal ring and two retaining rings in the mirror as seen in the plane of line 4—4 in FIG. 3, and looking in the direction of the arrows.

FIG. 5 is a cross-sectional view of the structure in the privious drawing figure, as seen in the plane of line 5—5 therein, and looking in the direction of the arrows.

FIG. 6 is a cross-sectional view, of just the mirror frame member of the present construction, as seen in the plane of line 6—6 in FIG. 3, and looking in the direction of the arrows.

GENERAL DESCRIPTION OF THE ILLUSTRATED EMBODIMENT

Figure 1:
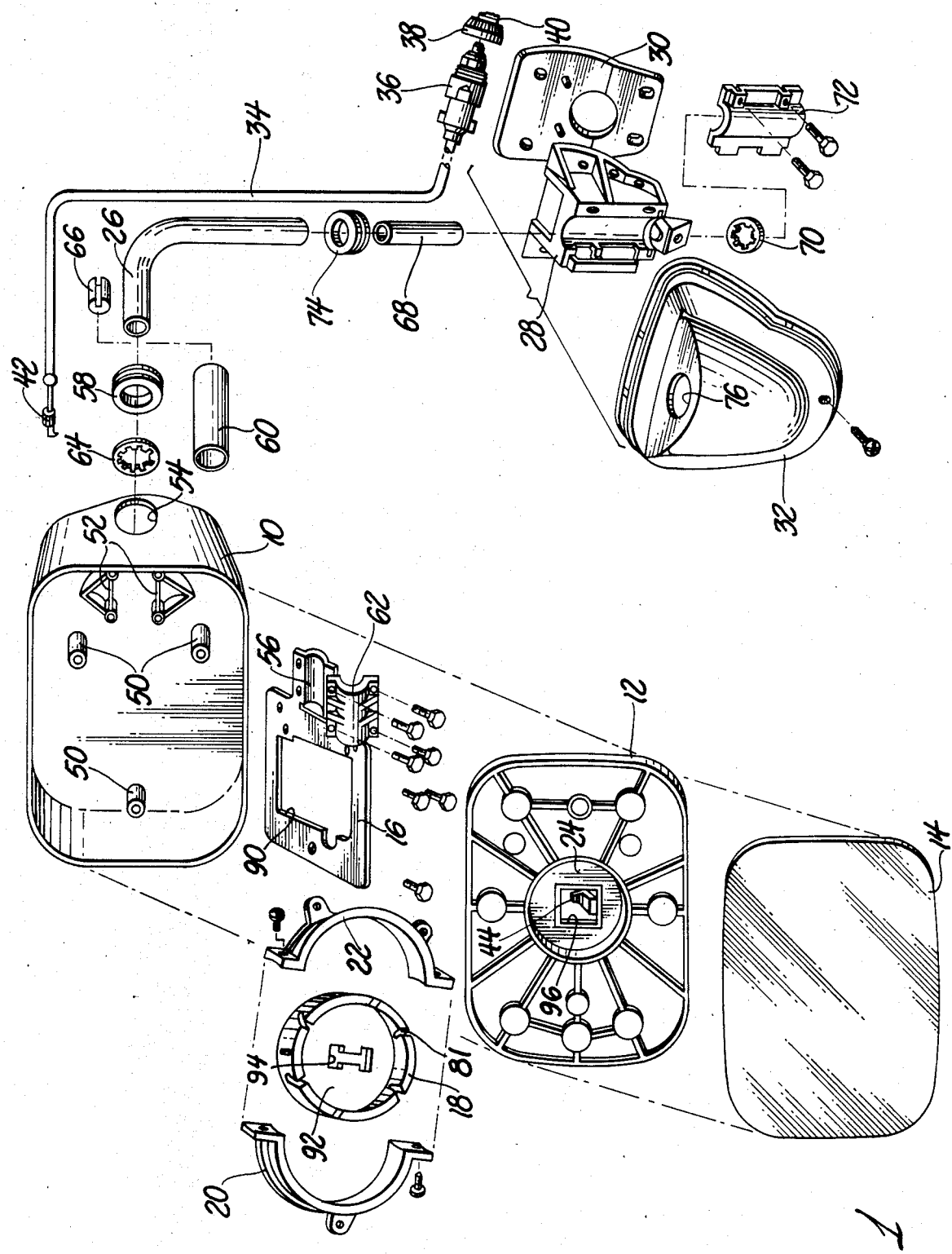
FIG. 1 is an exploded view of the mirror assembly of the present invention.
Figure 2:
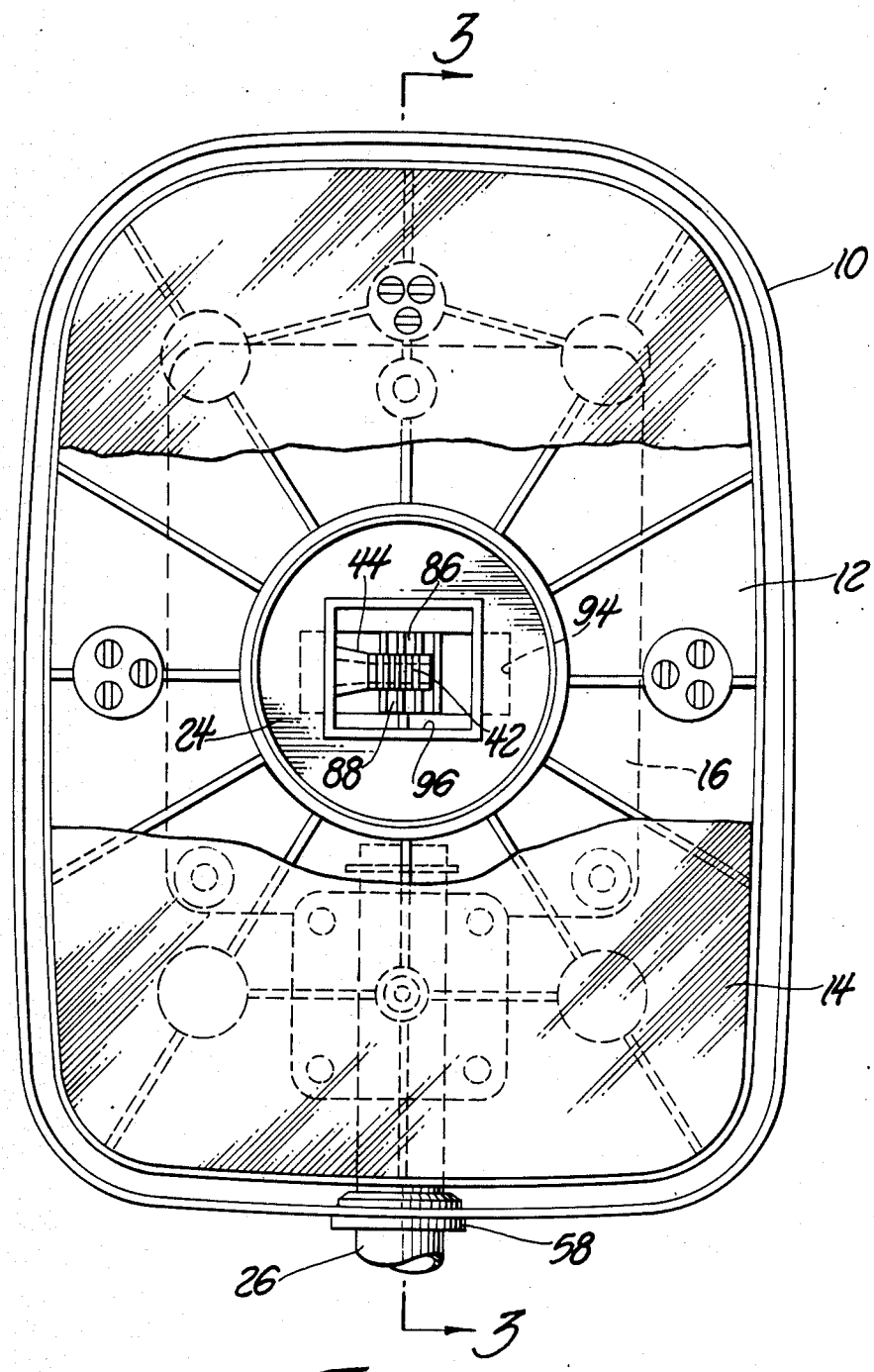
FIG. 2 is a front plan view of the mirror as assembled in the mirror housing and with the mirror glass shown partially broken away to reveal the mirror frame member and other structure therebehind.

The mirror assembly includes a mirror shell or housing 10 within which is disposed a mirror frame 12 that has a mirror glass 14 fastened to it.

A mounting plate 16 is fastened in the mirror shell 10 and has a gimble ring 18 disposed thereover, which is pinned to two retainer rings 20 and 22 that are fastened to the mounting plate, in a manner allowing pivotal movement about one axis. And the back side of the mirror frame 12 is formed to include a projection 24 that is spherically fitted into the gimbal ring and includes means for causing pivotal movement of the mirror frame and its mirror glass about a second transverse axis.

The mirror housing 10 is mounted on the end of a tubular arm 26 which includes a right angle bend and has its other end engaged in a mounting bracket 28. The mounting bracket is fastened to a plate 30 that fastens to a vehicle body wall. And, a cover part 32 encloses the whole mounting bracket assembly.

A bowden wire control cable 34 is passed through the tubular arm 26 to allow one end to extend into the mirror housing to vertically and horizontally adjust the mirror glass (in a manner later discribed) and the other end of the control cable passes through the mounting bracket 28, the plate 30 and the vehicle body wall (not shown). The control mechanism 36 on the end of the control cable includes a large knob 38 and a smaller knob 40 by which the cable may be extended and retracted within the mirror housing, and/or turned, to effect vertical and horizontal adjustment of the mirror glass.

A small pinion gear 42 on the end of the control cable in the mirror housing is received and retained by means provided on the back of the gimble ring 18 and in a manner that enables lateral movement of the pinion gear to effect a rocking movement of the gimble ring. And, an arm 44 on the back of the mirror frameprojection 24 extends through the back of the gimbal ring and includes a gear segment 46 that is engaged with the pinion gear in a manner that causes axial rotation of the ginion gear to effect rocking movement of the mirror frame in a different direction. As a consequence, lateral or axial cable movement will effect vertical or horizontal adjustment of the mirror glass in the mirror housing.

DETAILED DESCRIPTION OF STRUCTURE

The mirror housing or shell 10 is of molded one piece plastic construction capable of having a chrome plated finish applied and which is formed to include mounting pads 50 for the mounting plate 16 and structurally braced pads 52, near the opening 54 through which the tubular arm 26 is received, for added strength in receiving and holding the arm member thereto.

The mounting plate 16 is fixed by screw fasteners to the mounting pads in the mirror housing and the end of the tubular arm 26 is received through the end wall opening 54 and onto the reciptively formed end 56 of the mounting plate. It is actually received through a rubber gromet 58 retained on the shell wall, in the opening 54, and through a short tube or sleeve part 60 that is held by a clamp 62 on the mounting plate end 56. A lock ring 64 on the end of the tubular arm 26 keeps the arm engaged in the sleeve part and enables the mirror housing to be manually adjusted on the arm.

A cable guide member 66 is provided in the tubular arm for the control cable 34 that extends through the arm and is operative of the mirror in the manner previously described.

The mounting bracket 28, receptive of the other end of the support arm 26, is formed to receive the tube end, in a sleeve 68, and with a lock washer 70 on the end thereof, and to have a clamp 72 fastened thereover, like at the other end, to allow limited manual adjustment. And the cover part 32, which is of molded plastic with a chrome finish, like the mirror housing or shell 10, has a rubber gromet 74 in the wall opening 76 for the support arm and is used to cover and enclose the assembly on a vehicle body side wall.

Referring back to the mirror housing, and as best shown in FIGS. 3-6, the projection 24 on the back side of the mirror frame member is formed to include a spherical surfaced side wall, as at 78, which mates with and is fitted in the gimbal ring 18 whose inner side wall is receptively formed, as at 80, so that relative movement between the mirror frame and gimble ring is allowed. The gimble ring 18 also has its external wall formed to include relief slots 81 and a spherical surface, as at 82, which mates with the receptively formed inner side walls of the two retainer rings. And, diametrically oppositely disposed pins 84 provided on the gimbal ring are engaged in receptive openings provided in the retainer rings, where the two are joined together, so that the gimbal ring is itself pivotal about a given axis.

The retainer rings 20 and 22 are fastened to the mounting plate 16 in the housing shell with the same fastener means that fixes the mounting plate in the housing. And, they hold the gimbal ring 18 pinned between them and permit relative movement only about the pinned axis. The mirror frame is in turn engaged and held to the gimbal ring in a manner whereby it is offorded freedom of movement, for viewing adjustment of the mirror glass, only about a transverse axis. Thus, if the gimbal ring 18 is caused to move about its pinned axis, the mirror frame and its glass are adjusted in one given direction, and if the mirror frame itself is caused to move in the gimbal ring then the mirror glass is adjusted in a transverse direction.

The mirror frame and its glass are held and retained in the housing 10 by having the arm 44 on the back wall projection 24 engaged to and behind the pinion gear 42 on the inner end of the control cable 34.

The small pinion gear 42 is received and relatively held between two relatively spaced rearwardly projecting arms 86 and 88 on the back side of the gimbal ring 16. These two arms extend into an opening 90 in the mounting plate 24 and are formed at their ends for snap-fastening of the control cable therein and holding the pinion gear between them.

The gimbal ring is formed to include a back wall 92 within which is provided an opening 94. And, the two gear receptive arms are formed to set within and extend rearwardly so they are spaced relatively over and behind this opening.

The back wall projection 18 on the mirror frame member 12 is similarly formed with a back wall of its own that has an opening 96 formed in it. And the arm 44, mentioned previously, and that is provided on the back side of the mirror frame projection, extends over and beyond this opening and has its underside formed to include a gear tooth segment with the same tooth count and pitch of the small pinion gear 42.

The length of the arm 44 is such as will place it on the far side of the pinion gear 42 as disposed between the arms 86 and 88 on the gimbal ring 16.

The mirror frame 12 and the gimbal ring 18 are also held together by the arm 44 on the frame part being engaged behind the pinion gear 42 that is retained on the arms 86 and 88 of the gimbal ring. And the gimbal ring is in turn pinned, but afforded relative movement, to the retainer rings 20 and 22 which are fastened to the mounting plate 16 in the mirror housing.

Push-pull, axial movement, of the cable 34, by turning the smaller control knob 40, will cause the cable to move the small pinion gear 42 in the mirror housing laterally and act against the arms 86 and 88 on the gimbal ring and cause the gimbal ring, with the mirror frame and glass that are engaged to it, to be pivotally adjusted about the pin axis and effect a mirror adjustment.

Axial rotation of small pinion gear, by turning the larger control knob 38 on the end of the control cable 34, and by its gear tooth engagement with the gear segment 46 on the end of the mirror frame arm, will cause the mirror frame and its mirror glass to be adjusted seperate and apart from the gimbal ring, due to its pinned engagement with the retaining rings, and effect a different and distinct mirror adjustment.

ASSEMBLY AND OPERATION

The gimbal ring 18 is shown to have its side walls slotted to allow the back wall projection 24 on the mirror frame part 12 to be snapped into engagement with it. The outer spherical surface 78 on the mirror frame part is matched to the inner spherical surface 80 on the gimbal ring so that the two are fitted but relatively movable on each other.

The two parts of the retainer ring 20 and 22 are next engaged together and about the gimbal ring 18, with the pivot pins 84 held therebetween in a manner allowing pivotal movement of the gimbal ring on the retainer rings about the pivotal axis provided by the two pins.

The mounting plate 16 is laid in the mirror housing 10. The rubber seal 58 for the tubular arm 26 is placed in the receptive hole 54 in the housing, the end of the tubular arm is placed through it, the sleeve 60 is put on the end of the arm, and the lock washer is added thereafter. The clamping plate 62 is next fastened to the mounting plate and the mounting plate is fastened to the housing shell by the same screw fasteners.

The other end of the tubular arm 26 is similarly assembled to the mounting bracket 28, with the control cable pre-threaded through the tubular arm, less the control mechanism 36, which is usually added last, and with the cover part 32 shoved up and disposed loosely on hte tubular arm to allow the bracket 28 and mounting plate to be fastened to a vehicle body wall before it is fastened thereover.

The control cable 34 is pulled through the tubular arm enough to enable disposing the small pinion gear 42 on the end of the cable in snap fitted engagement within and between the two arms 86 and 88 on hte gimbal part and immediately under the gear segment part on the rearwardly projecting arm 44 on the back of the mirror frame member. The, the whole assembly is fastened to the mounting plate 16, and the mounting plate is fastened to the receptive pads 50 in the housing shell by the same screw fasteners, through access openings aligned therewith and provided in the mirror frame member, before the mirror glass is fastened to it.

When the mounting plate and the retainer rings with the gimbal ring and mirror frame part preassembled to them, are fastened into the housing, the assembly is complete, at the mirror end, except for having the mirror glass 14 fastened, by glue or other means, to the receptive pads on the face of the mirror frame member.

Subsequently, as desired, the mirror is adjusted by pivotal actuation of the gimbal ring, in the retainer rings, which causes the mirror frame to move with it, or by gear actuation causing the mirror frame to move in the spherical ball socket with the gimbal part, transversely of the first mentioned movement.

It will also be appreciated, although not specifically shown, that the mirror assembly disclosed, without the control cable mechanism, provides a manually operable mirror for automotive vehicle and other uses. The same parts that are used for the remote control operated rear view mirror, except for the control cable and its associated parts, will afford a mirror assembly which may be manually, externally, adjusted and has sufficient frictional resistance built into the parts as assembled, to maintain any manually selected viewing position that the mirror is adjusted to.

Such further claims and advantages as are due the mirror construction disclosed by this invention will be better appreciated in the wording of the claims which follow.

I claim:

1. A rear view mirror assembly comprising;

a housing shell having a mirror glass receptive opening provided therein, mounting pads formed within and on a back wall of said housing shell and a mounting plate adapted to be engaged on said pads, a mirror glass receptive frame part received within the opening in said housing shell and having a spherical surfaced projection on a back side thereof, a gimbal ring member adapted for gimbal mounting and having the projection on the back side of the mirror glass frame part received in snap-lock spherical engagement therewith, a pair of retainer rings adapted to be clamped together and to have said gimbal ring member pinned to said rings for movement about a given axis, said retainer rings and mounting plate being held and retained in said housing shell by the same fastener means, said gimbal mounted ring member having an inner wall surface thereof formed to complement the spherical form of the back wall projection on said mirror glass frame part and formed to include relief slots to afford the snap-lock engagement aforesaid, said back wall projection being also formed to include a rearwardly disposed arm having a gear tooth segment provided on an extended end thereof, said gimbal mounted ring member having a back wall and an opening formed in said back wall receptive of said rearwardly disposed arm and the gear toothed segment therethrough, means mounted on the back wall of the gimbal mounted ring member and for engagement with the gear toothed segment on said rearwardly disposed arm to effect relative movement therebetween, remote control means associated with said last mentioned means to effect movement both thereof and of said gimbal ring member relative to said retainer rings, and said remote control means including a bowden wire and said last mentioned means including a small pinion gear mounted on the end of said wire and between supporting arms formed on the back wall of said gimbal mounted ring member.

2. A rear view mirror assembly, comprising;

a housing shell having a mirror glass receptive opening provided thereon, mounting pads formed within and on a back wall of said housing shell and a mounting plate adapted to be engaged on said pads, a mirror glass receptive frame part received within the opening in said housing shell and having a spherical surfaced projection on a back side thereof, a gimbal ring member adapted for gimbal mounting and having the projection on the back side of the mirror glass frame part received in snap-lock spherical engagement therewith, a pair of retainer rings adapted to be clamped together and to have said gimbal ring member pinned to said rings for movement about a given axis, and said gimbal mounted ring member having an inner wall surface thereof formed to complement the spherical form of the back wall projection on said mirror glass frame part and formed to include relief slots to afford the snap-lock engagement aforesaid.

3. The rear view mirror of claim 2, said retainer rings and mounting plate being held and retained in said housing shell by the same fastener means.

4. The rear view mirror of claim 3, wherein said fastener means comprise a plurality of screw fasteners.

5. The rear view mirror of claim 4, wherein said screw fasteners affix into said mounting pads formed on the back wall of said housing shell.

* * * * *